United States Patent [19]
Uchida et al.

[11] Patent Number: 5,083,228
[45] Date of Patent: Jan. 21, 1992

[54] TRACKING ERROR DETECTING CIRCUIT

[75] Inventors: Kazuhiro Uchida, Kanagawa; Kikuo Yamamoto, Tokyo, both of Japan

[73] Assignee: Sony Corporation, Tokyo, Japan

[21] Appl. No.: 396,320

[22] Filed: Aug. 21, 1989

[30] Foreign Application Priority Data

Aug. 29, 1988 [JP] Japan ............... 63-215852

[51] Int. Cl.[5] ............................................. G11B 5/584
[52] U.S. Cl. ................................... 360/77.14; 360/18
[58] Field of Search ..... 360/10.2, 70, 18, 77.01–77.17, 360/73.02, 73.09–73.12; 358/323, 327

[56] References Cited

U.S. PATENT DOCUMENTS 4,530,012  7/1985  Kinjo .............................. 360/77.14
4,677,503  6/1987  Nagasawa et al. ............... 360/77.14
4,839,755  6/1989  Yamada et al. .................. 360/77.14

Primary Examiner—Vincent P. Canney
Assistant Examiner—Steven R. Garland
Attorney, Agent, or Firm—Alvin Sinderbrand; William S. Frommer

[57] ABSTRACT

An information signal comprised of a video component and a tracking information component which has been recorded in parallel oblique tracks on a record medium is reproduced by plural transducers which scan successive tracks. The tracking information component is separated from the reproduced information signal to derive error detection signals representing scanning errors of the transducers. Plural ones of the error detection signals are averaged to produce tracking control signals.

7 Claims, 3 Drawing Sheets

TRACKING ERROR DETECTING CIRCUIT

BACKGROUND OF THE INVENTION

1. Field of the Invention

This invention relates to tracking control of transducers which scan successive tracks to reproduce previously recorded information and, more particularly, to tracking control apparatus used in an automatic track following (ATF) system which relies upon previously recorded pilot signals to produce a tracking error indication.

2. Description of the Prior Art

U.S. Pat. No. 4,509,083, assigned to the assignee of the instant invention, describes a prior art proposal of an ATF system employing pilot signals of different frequencies for the purpose of achieving tracking control of transducers which scan previously recorded record tracks on a record medium. Although the tracking control technique described therein exhibits ready application for numerous types of information storage systems, it is particularly useful for controlling the scanning of oblique record tracks across a magnetic tape in which video signals have been recorded.

More particularly, pilot signals of different frequencies, such as frequencies $f_1$, $f_2$, $f_3$ and $f_4$, all easily separable from recorded video signals, as by way of band pass filtering, are recorded in successive tracks. Thus, pilot signal $f_1$ is recorded in track #1, pilot signal $f_2$ is recorded in track #2, pilot signal $f_3$ is recorded in track #3, pilot signal $f_4$ is recorded in track #4, pilot signal $f_1$ is recorded in track #5, pilot signal $f_2$ is recorded in track #6, and so on. When, for example, the signals recorded in track #2 are reproduced, if the transducer which scans track #2 is subjected to a tracking error and, thus, is off-center, a cross-talk pilot signal component will be reproduced. Thus, in addition to pilot signal $f_2$, which is played back from track #2, a cross-talk component of pilot signal $f_1$ may be reproduced from track #1 with a magnitude related to the tracking error of the transducer. Alternatively, if the transducer is subjected to a tracking error in the opposite direction such that a portion of track #3 is scanned thereby, a cross-talk component of pilot signal $f_3$ will be reproduced in addition to pilot signal $f_2$. In this example, the magnitudes of cross-talk pilot signals $f_1$ and $f_3$ are sampled and compared to each other, with the result of this comparison being representative of the tracking error direction (that is, whether the transducer which is scanning track #2 also is picking up track #1 or track #3). The result of this comparison produces a tracking error control signal which, when applied to suitable adjustment devices, such as a bimorph support for the transducer or tape transport mechanisms, tends to return the transducer to its on-center position while scanning track #2.

The foregoing tracking control arrangement (as well as a similar tracking control technique which has been proposed heretofore and which will be described below) detects a tracking error at each scan, or pass, of a transducer along a track. This tracking error detection is fed back and used immediately as a servo control signal to correct the detected error. Thus, if a tracking error is detected during each transducer scan, that error is corrected promptly. In so-called continuous error correction, any tracking error which is detected at any portion of the transducer scanning path is corrected substantially immediately; and it often happens that several such corrections are carried out while an individual transducer scans a single track. Thus, the transducer may be moved in the left and right directions relative to that track, thereby imparting flicker, jitter and other disturbances to the video picture derived from the video signal reproduced from that track.

Another drawback of the aforementioned tracking control technique is attributed, in part, to small differences in size and operating characteristics among the several transducers normally used in a VTR to scan successive tracks. The rotary scanning mechanism of most commercially available VTR's includes a rotary drum having two or four record/playback heads mounted thereon. While such heads may satisfy manufacturing tolerances, as a practical matter the recording/reproducing characteristics of one head may differ somewhat from those of another. Furthermore, the mounting position of one head on the rotary drum may differ ever so slightly from the mounting position of another. Consequently, one record track may be slightly narrower than an adjacent track and, as a result, even when a reproducing head exhibits an on-center scanning path, it may pick up a cross-talk pilot frequency component from an adjacent track. Accordingly, this picked up component will be interpreted as a tracking error, resulting in an immediate attempt to "correct" the scanning path of the transducer. The resulting irregular scanning of the record tracks tends to repeat cyclically; for example, after the scanning of four successive tracks in which four different pilot signals are respectively recorded. Immediate attempts to "correct" what is perceived to be a tracking error results in zig-zag scanning of the record tracks, either by moving the bimorph transducer support or by changing the tape transport speed, resulting in wow and flutter which produces flicker and jitter in the displayed video picture.

It is believed that the foregoing drawbacks can be minimized, without reducing the efficacy of tracking control, by reducing the sensitivity of tracking control apparatus to instantaneous errors which may be detected as the transducer scans a record track.

OBJECTS AND SUMMARY OF THE INVENTION

Therefore, it is an object of the present invention to provide improved tracking error control apparatus which avoids the aforementioned disadvantages and drawbacks found in the prior art, and substantially eliminates video flicker and jitter accompanying earlier tracking control techniques.

Another object of this invention is to provide a tracking error detecting circuit which operates to detect tracking errors accurately yet avoids unnecessary tracking compensation.

A further object of this invention is to provide tracking error control apparatus for use in video playback equipment and which accounts for differences in the operating characteristics of the transducers incorporated into such equipment.

An additional object of this invention is to provide tracking control apparatus for use with video playback equipment in which the quality of an image reproduced from previously recorded video signals is improved.

Various other objects, advantages and features of the present invention will become readily apparent from the ensuing detailed description, and the novel features will be particularly pointed out in the appended claims.

In accordance with this invention, apparatus is provided for reproducing an information signal that has been recorded in parallel oblique tracks on a record medium, the information signal being comprised of a video component and a tracking information component. Successive tracks are scanned by transducers to reproduce the information signal, and the tracking information component is separated therefrom to produce an error detection signal representing scanning errors of the transducers. Plural ones of these error detection signals are averaged to produce tracking control signals by which tracking errors are corrected.

As an aspect of this invention, the error detection signal produced in response to each scan of a track is sampled, and plural ones of the sampled error detection signals are averaged. For example, the error detection signal produced during each of four track scans is sampled, and these four sampled error detection signals are stored. Each newly sampled error detection signal, that is, each error detection signal sampled during a track scan, updates one of the four stored samples, and the updated stored samples are averaged. Alternatively, all four sampled error detection signals are replaced after four successive tracks are scanned, and the four new samples are averaged to produce a tracking control signal which is used during the scanning of the next four tracks.

As another aspect of this invention, the error detection signal which is produced while a transducer scans a track is sampled when the transducer arrives at the center portion of that track.

As an alternative aspect, the aforementioned sampling operation is carried out several times during a track scan such that a sample is produced when the transducer reaches different discrete locations along a track.

As a feature of this invention, the tracking information component is comprised of plural pilot signals of respective frequencies recorded in respective tracks. The frequencies are selected such that a particular frequency component is derived when the transducer exhibits a tracking error displaced in one direction, and a different frequency component is derived when the transducer exhibits a tracking error displaced in the opposite direction. An error detection signal is produced as a function of such frequency components.

BRIEF DESCRIPTION OF THE DRAWINGS

The following detailed description, given by way of example, and not intended to limit the present invention solely thereto, will best be understood in conjunction with the accompanying drawings in which.

DETAILED DESCRIPTION OF A PREFERRED EMBODIMENT

Figure 1:
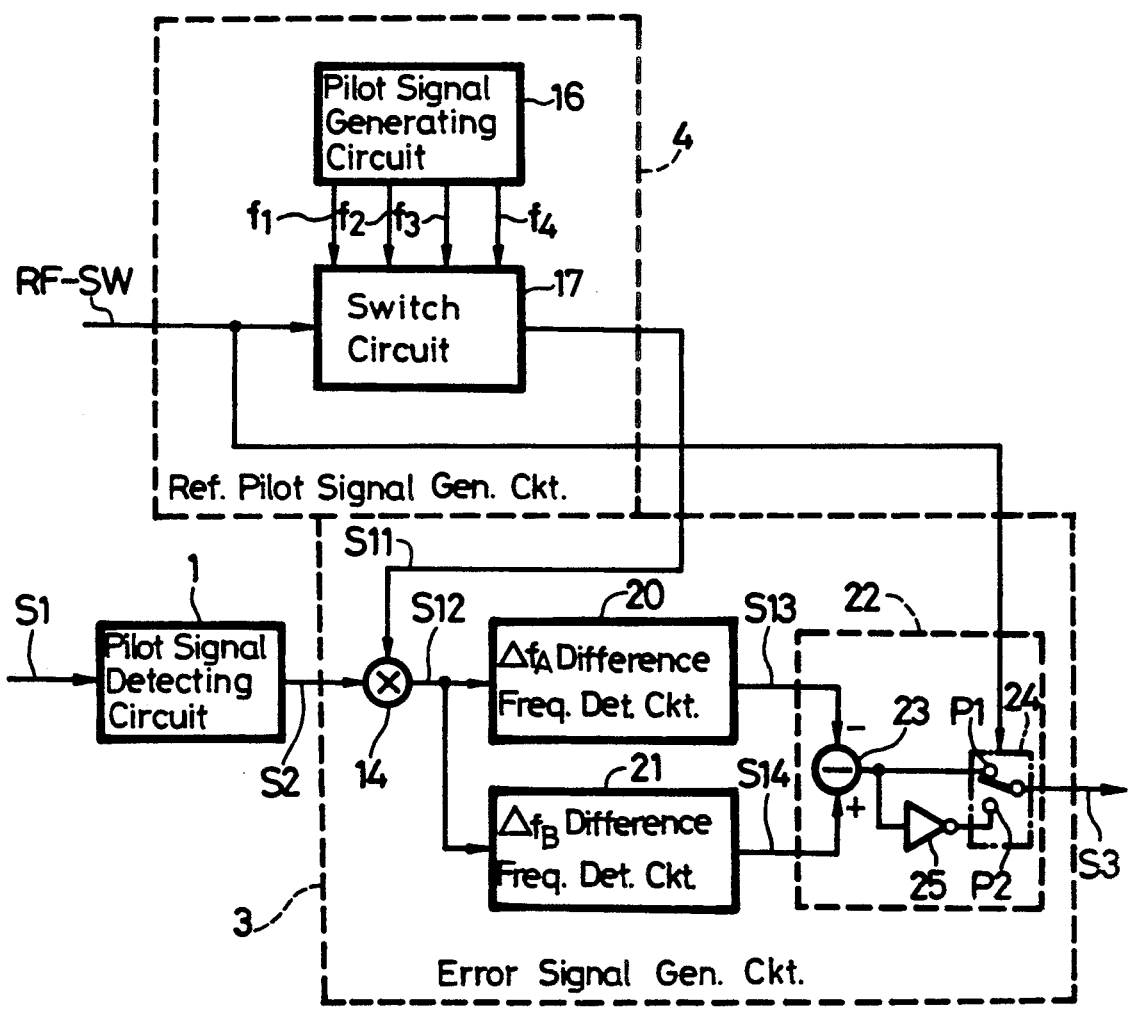
FIG. 1 is a block diagram of one example of prior art tracking control apparatus.

Before describing one embodiment of the present invention, reference is made to FIG. 1 which is a block diagram of tracking control apparatus proposed by the prior art. It will be appreciated that the apparatus shown in FIG. 1 differs somewhat from that described in aforementioned U.S. Pat. No. 4,509,083.

Figure 2:
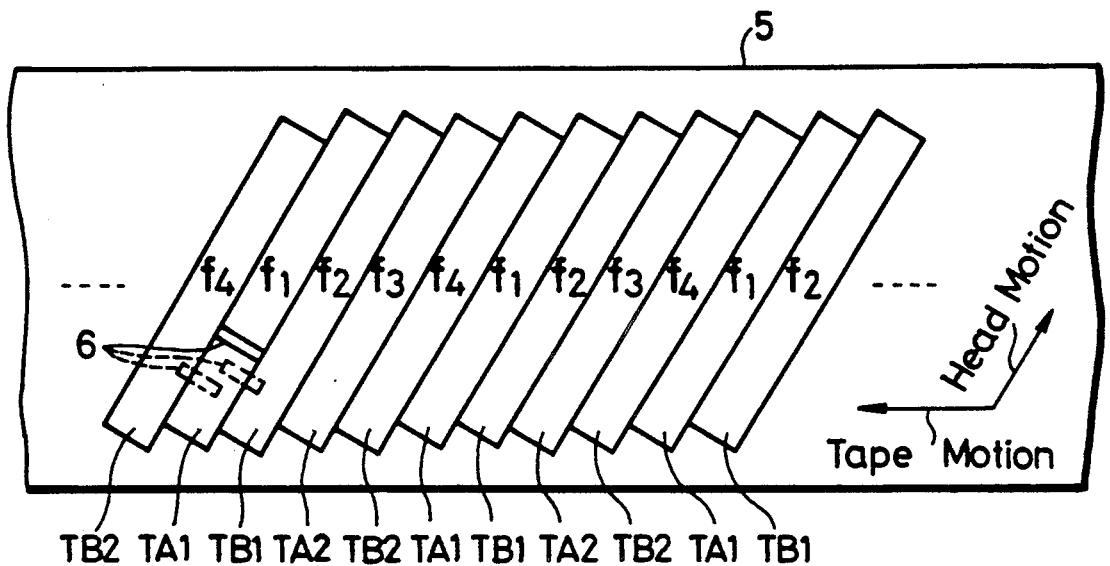
FIG. 2 is a schematic representation of plural record tracks scanned by a transducer.

For convenience, the tracking control apparatus shown in FIG. 1 and described hereafter is discussed in the context of video signal reproduction, such as a video tape recorder (VTR). It is appreciated that a VTR records video signals in parallel, oblique tracks across a magnetic tape by successively scanning that tape with two or four rotary magnetic heads. In addition to recording video signals in a track, the head also records a pilot signal of a frequency sufficiently different from the frequency characteristics of the video (and audio) signals as to be easily separated by band pass filtering. Although $\underline{n}$ different pilot frequencies may be used (wherein $\underline{n}$ is any suitable number), the apparatus shown in FIG. 1 records four different pilot signals of frequencies $f_1$, $f_2$, $f_3$ and $f_4$ in four respective tracks. As shown in FIG. 2, these tracks may be thought of as groups of four, with pilot frequency $f_1$ recorded in track TA1, pilot frequency $f_2$ recorded in track TB1, pilot frequency $f_3$ recorded in track TA2 and pilot frequency $f_4$ recorded in track TB2. Thereafter, this cycle of four tracks TA1, TB1, TA2, and TB2 is repeated, with pilot frequencies $f_1$, $f_2$, $f_3$ and $f_4$ recorded in tracks TA1, TB1, TA2 and TB2, respectively.

The tracking control apparatus shown in FIG. 1 is comprised of a pilot signal detecting circuit 1, an error signal generating circuit 3 and a reference pilot signal generator 4. Pilot signal detecting circuit 1 is adapted to receive the reproduced video signal S1 which is accompanied by the pilot signal recorded in the track being scanned as well as a cross-talk pilot signal component from an adjacent track, depending upon the displacement of the transducer from the center line of the track being scanned. For example, and as shown in FIG. 2, if a transducer 6 scans track TA1, the pilot signal of frequency $f_1$ is reproduced along with the video signal S1 from track TA1. If transducer 6 exhibits a tracking error such that it is displaced to the left of the center line of track TA1, the transducer picks up a pilot frequency component $f_4$ from adjacent track TB2. Alternatively, if transducer 6 exhibits a tracking error such that it is displaced to the right of the center line of track TA1, the transducer picks up a pilot frequency component $f_2$ from track TB1. Thus, video signal S1 may be thought of as an information signal comprised of a video component and a tracking information component, the latter being comprised of pilot signal frequencies which are related to the tracking error of the transducer. For the example discussed thus far wherein transducer 6 scans track TA1, in an ideal case the tracking information component is formed of pilot signal frequency $f_1$ in the absence of any tracking error, the tracking information component is formed of pilot signal frequencies $(f_1+f_4)$ when transducer 6 is displaced to the left of the center line of track TA1, and the tracking information component is formed of pilot signal frequencies $(f_1+f_2)$ when the transducer is displaced to the right of this center line.

Pilot signal detecting circuit 1 includes band pass filter circuits to separate the tracking information component, that is, the pilot signal frequencies, from information signal S1. The separated pilot signals S2 are supplied to a multiplier, or modulator 14, included in error signal generating circuit 3. Modulator 14 also is coupled to reference pilot signal generator 4 to receive one of the four pilot signal frequencies $f_1$, $f_2$, $f_3$ and $f_4$, depending upon which track is being scanned by transducer 6. As shown, reference pilot signal generator 4 includes a pilot signal generator 16 for generating the pilot signal frequencies $f_1$–$f_4$ and a switch circuit 17 coupled to the pilot signal generator for selecting one of these four pilot signal frequencies for application to modulator 14. Switch circuit 17 is supplied with a head switching signal RF-SW which controls the switch circuit as a function of the track being scanned. For example, when transducer 6 scans track TA1, head switch signal RF-SW controls switch circuit 17 to apply pilot signal frequency $f_1$ from pilot signal generator 16 to modulator 14. Likewise, when transducer 6 scans track TB1, head switching signal RF-SW controls switch circuit 17 to couple pilot signal frequency $f_2$ to modulator 14. In a similar manner, when transducer 6 scans track TA2, the head switching signal controls switch circuit 17 to couple pilot signal frequency $f_3$ to the modulator; and when track TB2 is scanned, the switch circuit is controlled to supply pilot signal frequency $f_4$ to modulator 14. The pilot signal picked up from a track adjacent that being scanned is designated a cross-talk component; and the amplitude of this cross-talk component is a function of the tracking error of transducer 6.

As a numerical example, the four pilot signal frequencies may be as follows:

$f_1 = 102$ kHz
$f_2 = 118$ kHz
$f_3 = 164$ kHz
$f_4 = 148$ kHz

Modulator 14 produces an output signal S12 including sum and difference frequency components, as are normally produced by a modulator. The output of the modulator is coupled in parallel to two difference frequency detecting circuits 20 and 21 which may be comprised of band pass filters. Since difference frequency detectors are used, only the difference frequency component included in modulator output S12 need be considered.

Let it be assumed that transducer 6 scans track TA1 but exhibits a tracking error displaced to the left such that a portion of track TB2 also is scanned. As a result, pilot signal frequencies $(f_1+f_4)$ are present in the detected tracking information component S2, and these pilot signal frequencies are modulated by reference pilot frequency $f_1$. The difference frequency component included in modulator output S12 thus is $(f_4-f_1)=46$ kHz. Alternatively, if transducer 6 exhibits a tracking error displaced to the right of track TA1 such that a portion of track TB1 is scanned, the pilot signal frequencies included in tracking information component S2 is $(f_1+f_2)$; and the difference frequency output S12 from modulator 14 is $(f_2-f_1)=16$ kHz. Likewise, if track TB1 is scanned, the difference frequency component produced by modulator 14 for a tracking error displaced to the left of this track is $(f_2-f_1)=16$ kHz; whereas the difference frequency component produced by the modulator for a tracking error displaced to the right is $(f_3-f_2)=46$ kHz. A similar analysis for the scanning of tracks TA2 and TB2 results in a difference frequency component $(f_3-f_2)=46$ kHz if transducer 6 is displaced to the left of track TA2, a difference frequency component $(f_3-f_4)=16$ kHz if the transducer is displaced to the right of track TA2, a difference frequency component $(f_3-f_4)=16$ kHz if transducer 6 is displaced to the left of track TB2, and a difference frequency component $(f_4-f_1)=46$ kHz if the transducer is displaced to the right of this track.

It is seen that two different difference frequency components $\Delta f_A$ and $\Delta f_B$ will be produced if the transducer exhibits a tracking error displaced to the left or right of the track being scanned. These difference frequency components may be summarized as follows:

$$\Delta f_A = f_2 - f_1 = f_3 - f_4 = 16 \text{ kHz}$$

$$\Delta f_B = f_3 - f_2 = f_4 - f_1 = 46 \text{ kHz}$$

Difference frequency detector 20 may include a relatively narrow band pass filter adapted to pass the difference frequency component $\Delta f_A$ and difference frequency detector 21 may include a narrow band pass filter adapted to pass the difference frequency component $\Delta f_B$. The output of difference frequency detector 20 is subtracted from the output of difference frequency detector 21 by a subtractor circuit 23 included in an error signal forming circuit 22. It is expected that, in the absence of a tracking error, the output signals S13 and S14 produced by difference frequency detectors 20 and 21 will be equal. However, if transducer 6 exhibits a tracking error, then, depending upon the track being scanned and the direction of the tracking error displacement, output signals S13 and S14 will differ from each other, thus producing an output signal from subtractor 23.

The output of subtractor 23 is coupled to an inverter 25, and a change-over switch 24 supplies either the output or the inverted output of the subtractor as the tracking error signal S3. Switch 24 is controlled by head switching signal RF-SW and switches between the normal and inverted output of subtractor 23 as a function of the particular track being scanned.

In operation, let it be assumed that track TA1 is scanned by transducer 6. Head switching signal RF-SW controls switch circuit 17 to supply pilot signal frequency $f_1$ to modulator 14. Additionally, switch 24 is controlled to couple the output (as opposed to the inverted output) of subtractor 23 as the tracking error signal. Now, if transducer 6 is displaced to the left of center of track TA1, the level of the pilot signal of frequency $f_4$ exceeds the level of the pilot signal of frequency $f_2$ in tracking information component S2. Thus, the level of the difference frequency component $\Delta f_B$ (which equals $f_4-f_1$) is greater than the level of difference frequency component $\Delta f_A$ (which equals $f_2-f_1$). Consequently, the output S14−S13 from subtractor 23 is a positive signal; and tracking error signal S3 is positive, indicative of a tracking error displacement to the left, with a magnitude indicative of the extent of this error. Alternatively, if transducer 6 is displaced to the right of center of track TA1, then the level of the pilot signal of frequency $f_2$ exceeds the level of the pilot signal of frequency $f_4$ in tracking information component S2. Consequently, the signal level of difference frequency component $\Delta f_A$ exceeds the signal level of difference frequency component $\Delta f_B$; and the output S14−S13 from subtractor 23 exhibits a negative polarity. Thus, the polarity of tracking error signal S3 represents the direction of error displacement of transducer 6 relative to track TA1, wherein a positive polarity is indicative of a tracking error to the left of center and a negative polarity is indicative of a tracking error to the right of center.

When track TB1 is scanned, head switching signal RF-SW controls switch circuit 17 to supply the reference pilot signal frequency $f_2$ to modulator 14; and the head switching signal also controls switch 24 to supply the inverted output of subtractor 23 as the tracking error signal S3. Now, if the transducer exhibits a tracking error displaced to the left of center of TB1, then the signal level of difference frequency component $\Delta f_A$ exceeds the signal level of difference frequency component $\Delta f_B$. Hence, the output S14−S13 of subtractor 23 is negative; but this negative output is inverted by inverter 25 and supplied as a positive tracking error signal S3. Conversely, if transducer 6 exhibits a tracking error displaced to the right of center of track TB1, then the signal level of difference frequency component $\Delta f_B$ exceeds the signal level of difference frequency component $\Delta f_A$ and the output S14−S13 of subtractor 23 is positive. This positive polarity is inverted by inverter 25 and supplied as a negative tracking error signal S3.

When track TA2 is scanned, head switching signal RF-SW controls switch circuit 17 to supply reference pilot signal of frequency $f_3$ to modulator 14; and the head switching signal also controls switch 24 to supply the non-inverted output of subtractor 23 as tracking error signal S3. A tracking error displaced to the left of center of track TA2 results in the signal level of difference frequency component $\Delta f_B$ being greater than the signal level of difference frequency component $\Delta f_A$, and the output S14−S13 of subtractor 23 is positive. Conversely, a tracking error displaced to the right of center of track TA2 results in the signal level of difference frequency component $\Delta f_A$ being greater than the signal level of difference frequency component $\Delta f_B$; and the output S14−S13 of subtractor 23 is negative.

Finally, when track TB2 is scanned, head switching signal RF-SW controls switch circuit 17 to couple the reference pilot signal of frequency $f_4$ to modulator 14; and the head switching signal also controls switch 24 to supply the inverted output of subtractor 23 as tracking error signal S3. If transducer 6 is displaced to the left of center of track TB2, the signal level of difference frequency component $\Delta f_A$ is greater than the signal level of difference frequency component $\Delta f_B$ and the output S14−S13 of subtractor 23 is negative. This negative output is inverted by inverter 25 and supplied as a positive tracking error signal S3. Conversely, if the transducer is displaced to the right of center of track TB2, then the signal level of difference frequency component $\Delta f_B$ is greater than the signal level of difference frequency component $\Delta f_A$ and the output S14−S13 of subtractor 23 is positive. This polarity is inverted by inverter 25, resulting in a negative tracking error signal S3.

The foregoing discussion may be summarized as follows:

| Scanned Track | Left Displace. | S14−S13 | Right Displace. | S14−S13 |
|---|---|---|---|---|
| TA1 | $\Delta f_B > \Delta f_A$ | + | $\Delta f_A > \Delta f_B$ | − |
| TB1 | $\Delta f_A > \Delta f_B$ | − | $\Delta f_B > \Delta f_A$ | + |
| TA2 | $\Delta f_B > \Delta f_A$ | + | $\Delta f_A > \Delta f_B$ | − |
| TB2 | $\Delta f_A > \Delta f_B$ | − | $\Delta f_B > \Delta f_A$ | + |

Since switch 24 is changed over as each successive track is scanned, it is appreciated from the foregoing table that when tracking error signal S3 exhibits a positive polarity, transducer 6 is displaced to the left of center of the track being scanned. Conversely, when tracking error signal S3 exhibits a negative polarity, the transducer is displaced to the right of center of the track being scanned. Consequently, the polarity of tracking error signal S3 represents the direction of tracking error and the magnitude of this signal represents the degree of that error. A suitable servo system (not shown) responds to this tracking error signal to correct such errors. Such servo system may include bimorph supports for the transducers or, alternatively, the transport speed of the magnetic tape (shown in FIG. 2 as tape 5) may be controlled such that transducer 6 is brought into alignment with the track being scanned.

Typical ATF tracking control apparatus of the type using the arrangement shown in FIG. 1 provides immediate control over the tape transport speed as transducer 6 scans a track. Such change in the tape speed results in flicker, jitter and other disturbances in the video picture displayed from the reproduced video signal, as mentioned above. Of course, if the precise dimensions and operating characteristics of the VTR transducers are identical, no tracking error is expected, unless the tape transport speed or rotary drum speed varies, or unless the tape is stretched. However, in practice, the operating characteristics and/or dimensions (such as gap width) of the VTR transducers may differ from one to the other. Consequently, the levels of the pilot signals recorded in each track may differ from one track to the next because of the different recording characteristics of the recording head; and the widths of the respective record tracks likewise may differ from one to the other because of slight differences in the gap widths of the heads. As a result, even if each transducer exhibits no actual tracking error when scanning tracks TA1-TB2, the aforementioned practicalities nevertheless may produce a tracking error signal S3. The servo system responds to this tracking error signal such that transducer 6 scans a record track in zig-zag fashion and/or the transport speed of the magnetic tape is increased and decreased cyclically. As a result, wow and flutter are produced causing flicker and jitter in the reproduced video picture. Such disturbances are attributed, at least in part, to immediate tracking correction in response to the instantaneously produced tracking error signal S3. Apparent tracking errors due to non-identical characteristics of the VTR transducers will be cyclical. That is, detected tracking errors which may be sensed when tracks TA1, TB1, TA2, and TB2 are scanned will be repeated when the next group of tracks TA1-TA2 is scanned. Such erroneous, cyclical tracking error indications are avoided in accordance with the present invention which averages the tracking error signals that are produced when each of tracks TA1, TB1, TA2 and TB2 is scanned.

Figure 3:
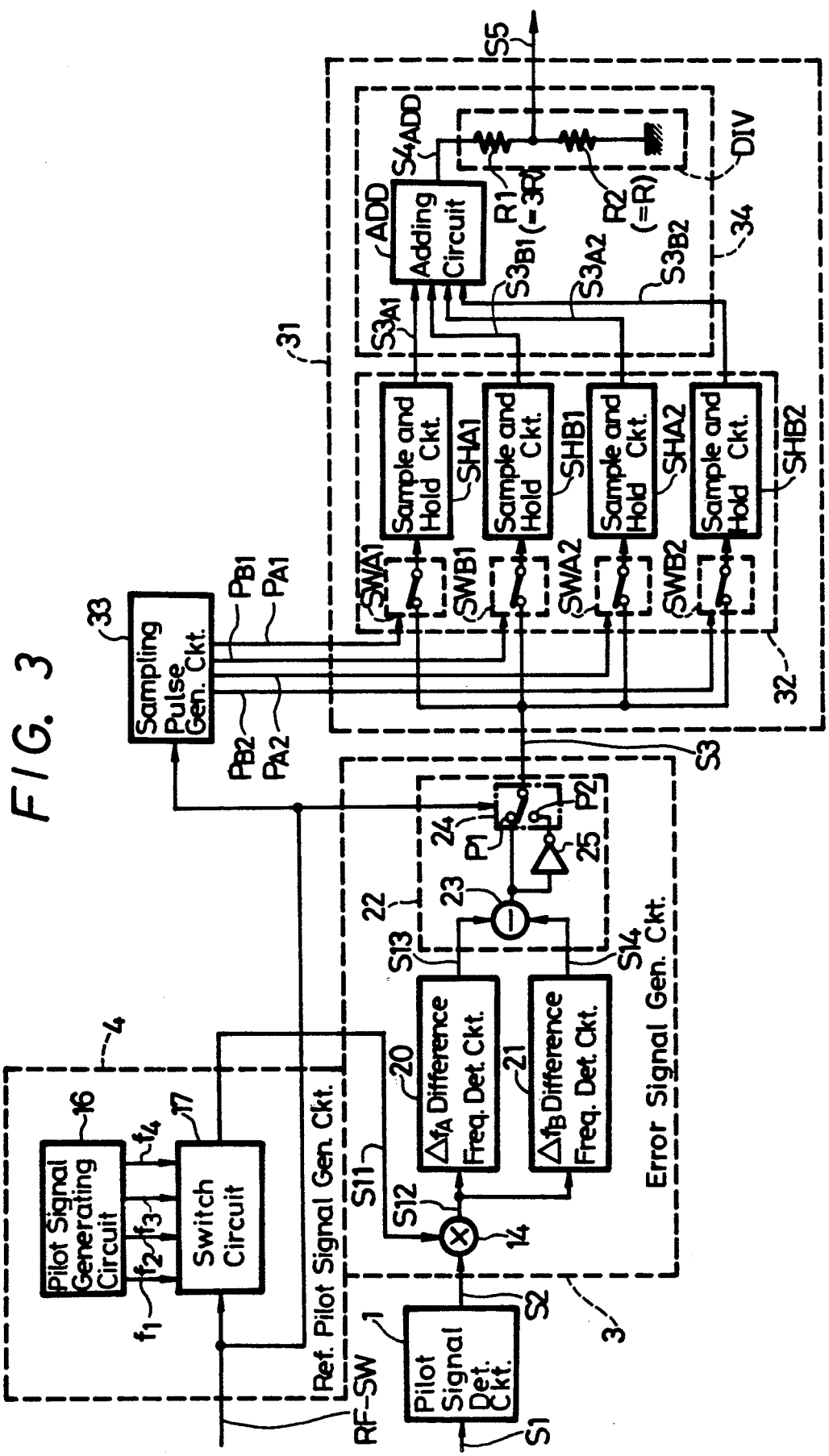
FIG. 3 is a block diagram of a preferred embodiment of the present invention.

One embodiment of the present invention which carries out the aforementioned averaging operation is illustrated in FIG. 3. As illustrated, the tracking control apparatus includes the pilot signal detector 1, error signal generator 3 and reference pilot signal generator 4 previously discussed in connection with FIG. 1. In the interest of brevity, further description of these circuits is not provided.

Tracking error signal S3 is supplied to an averaging circuit 31 comprised of a sampling circuit 32 and an average value calculating circuit 34. As shown, sampling circuit 32 includes sampling switches SWA1, SWB1, SWA2 and SWB2, connected in common to the output of error signal generator 3, and sample-and-hold circuits SHA1, SHB1, SHA2, and SHB2 coupled to the outputs of sampling switches SWA1, SWB1, SWA2 and SWB2, respectively. In the present example, since four individual pilot signals are recorded in four successive tracks, as schematically illustrated in FIG. 2, four sets of sampling switches and sample-and-hold circuits are used in sampling circuit 32. In general, if different pilot signals are recorded in respective tracks, then n sample-and-hold circuits and n sampling switches likewise are used. A sampling pulse generator 33 is adapted to produce successive sampling pulses PA1, PB1, PA2 and PB2, and these sampling pulses are coupled to sampling switches SWA1, SWB1, SWA2 and SWB2, respectively, with each sampling pulse operable to close the particular sampling switch to which it is coupled. Sampling pulse generator 33 is supplied with head switching signal RF-SW and is synchronized with the head switching signal such that sampling pulse PA1 is generated when track TA1 is scanned, sampling pulse PB1 is generated when track TB1 is scanned, sampling pulse PA2 is generated when track TA2 is scanned and sampling pulse PB2 is generated when track TB2 is scanned. In one embodiment of this invention, to be described in more detail below, each sampling pulse produced by sampling pulse generator 33 exhibits a relatively narrow time duration and is timed to occur when transducer 6 scans the center portion of a track. In an alternative embodiment, a plurality of sampling pulses is generated by the sampling pulse generator during each track scan, the time duration of each of these plural pulses being relatively narrow and each pulse being timed to occur when transducer 6 reaches a respective one of plural discrete locations along the scanned track.

The outputs of sample-and-hold circuits SHA1, SHB1, SHA2 and SHB2 are coupled to adding circuit ADD included in average value calculating circuit 34. Adding circuit ADD may be a conventional summing circuit adapted to sum the signal levels of signals S3A1, S3B1, S3A2 and S3B2 supplied from sample-and-hold circuits SHA1, SHB1, SHA2 and SHB2, respectively. The output S4 of adding circuit ADD is coupled to a dividing circuit DIV which, in the illustrated embodiment, is formed of a voltage divider comprised of resistors R1 and R2 connected in series. The junction defined by resistors R1 and R2 constitutes an output terminal from which a tracking control signal S5 is produced. In the embodiment wherein n different pilot signal frequencies are recorded in n different tracks, and wherein n outputs of n sample-and-hold circuits are summed, dividing circuit DIV is adapted to divide the summed signal level S4 by the factor $n$. In the present example wherein n =4, this is readily achieved merely by selecting R1 =3R and R2=R, wherein R is any appropriate, desired resistance value.

Figure 4:
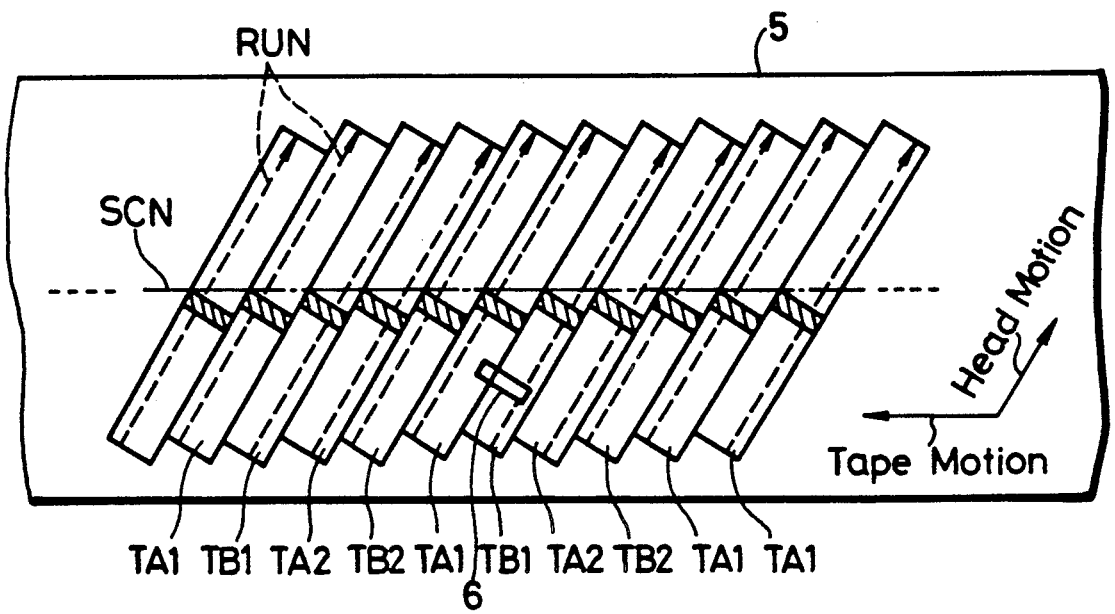
FIG. 4 is a schematic diagram of plural record tracks scanned by a transducer in accordance with the present invention.

In operation, let it be assumed that transducer 6 scans successive tracks TA1, TB1, TA2 and TB2, as shown in FIG. 4. As was discussed above in conjunction with FIGS. 1 and 2, let it be further assumed that, while scanning track TA1, the transducer is displaced to the left of center such that tracking error signal S3 exhibits positive polarity. When transducer 6 reaches the center portion of track TA1, as indicated by the shaded portion shown in FIG. 4, sampling pulse generator 33 supplies sampling pulse PA1 to switch SWA1 Consequently, the instantaneous magnitude of tracking signal S3 is sampled by sampling switch SWA1 and stored in sample-and-hold circuit SHA1. It will be appreciated that, prior to scanning track TA1, when track TB2 had been scanned, the magnitude of tracking error signal S3 at the time that transducer 6 reached the center portion of track TB2 had been sampled by sampling switch SWB2 in response to sampling pulse PB2 and had been stored in sample-and-hold circuit SHB2. Likewise, when track TA2 had been scanned, the magnitude of tracking error signal S3 at the time that transducer 6 reached the center portion of this track had been sampled and stored in sample-and-hold circuit SHA2; and the magnitude of tracking error signal S3 when transducer 6 reached the center portion of track TB1 had been sampled and stored in sample-and-hold circuit SHB1.

It is appreciated that the sampled error detection signal S3A1 stored in sample-and-hold circuit SH1 is updated with a fresh sample only when track TA1 is scanned. Likewise, sampled error detection signal S3B1 is updated only when track TB1 is scanned, sampled error detection signal S3A2 is updated only when track TA2 is scanned and sampled error detection signal S3B2 is updated only when track TB2 is scanned. Thus, the sampled error detection signal stored in a particular sample-and-hold circuit is updated with a fresh sample only once during the scanning of four successive tracks.

These sampled error detection signals S3A1, S3B1, S3A2 and S3B2 are summed in adding circuit ADD and divided by the factor 4 in dividing circuit DIV. Thus, tracking control signal S5 is an average of the sampled error detection signals and may be expressed as:

$$S5 = \tfrac{1}{4}(S3A1 + S3B1 + S3A2 + S3B2)$$

This averaged tracking control signal S5 is updated once during each track scan, but the influence of an updated sample is seen to be only one-fourth the influence of the instantaneous tracking error signal S3. Tracking control signal S5 may be used to vary the transport speed of the magnetic tape or, alternatively, the tracking control signal may be used to drive the respective bimorph supports for the VTR transducers.

By averaging the tracking error signal S3 produced over four (or, more generally, over $n$) track scans, the effects due to a fluctuating tracking error signal S3 or to sudden changes in the tracking error signal are mitigated. It is appreciated that, although tracking control signal S5 is updated when transducer 6 reaches the center portion of a scanned track, this updated tracking control signal nevertheless is supplied to the tracking servo mechanism over the entire length of a track scan. Hence, even if the record tracks TA-TB2 had been recorded in a zig-zag manner, transducer 6 nevertheless is stably controlled to scan each track correctly.

Recognizing that the record/reproduce characteristics of the transducers in a VTR vary from one to the other, the signal levels of the pilot signals reproduced from tracks TA-TB2 may not be equal. For example, the level of the pilot signal of frequency $f_1$ may appear to be greater than the level of the pilot signal of frequency $f_2$ which may appear to be greater than the level of the pilot signal of frequency $f_3$ which may appear to be greater than the level of the pilot signal of frequency $f_4$. Consequently, even if a transducer is on center of the track being scanned, the cross-talk component attributed to the pilot signal picked up from one adjacent track may be greater than the cross-talk component of the pilot signal picked up from the other. Error signal generating circuit 3 thus may produce a tracking error signal S3 which erroneously represents a tracking error displacement of the transducer of the type represented by the broken lines RUN shown in FIG. 4. Thus, when track TA1 is scanned properly, tracking error signal S3 may represent that transducer 6 is displaced to the right of the center line because the signal level of the pilot signal of frequency $f_2$ recorded in track TB1 will be greater than the signal level of the pilot signal of frequency $f_4$ recorded in track TB2. Likewise, when transducer 6 properly scans track TB1, tracking error signal S3 may erroneously indicate that the transducer is displaced to the left of the center line because the signal level of the pilot signal of frequency $f_1$ picked up from adjacent track TA1 is greater than the level of the pilot signal of frequency $f_3$ which is picked up from adjacent track TA2. The foregoing explanation is equally applicable when transducer 6 scans tracks TA2 and TB2. However, by averaging the sampled tracking error signals produced when tracks TA1-TB2 are scanned, these apparent differences in the pilot signal levels are averaged to zero. Thus, tracking control signal S5 does not erroneously indicate that transducer 6 is displaced to the broken line positions shown in FIG. 4. Thus, tracking errors which may be erroneously indicated because the pilot signals are recorded and reproduced with different amplitudes are eliminated. Consequently, cyclic corrected movement of the transducer 6, such as represented by the broken lines RUN shown in FIG. 4, is avoided. This, in turn, eliminates flicker and jitter in the reproduced video picture.

In the embodiment described above, tracking control signal S5 is updated with each new sample produced by one of sampling switches SWA1-SWB2 as a track TA1-TB2, respectively, is scanned. Thus, the tracking control signal is modified when the center portion of a scanned track is reached, and this modified tracking control signal is modified once again when the center portion of the next adjacent track is reached. As an alternative, tracking control signal S5 may be updated once when, for example, the beginning of track TA1 is scanned, and then updated once again only when this track is reached at a later time. Of course, the sampled tracking error signals S3A1, S3B1, S3A2 and S3B2 will be updated at each track scan, but the cumulative effect of such new samples will not be observed until track TA1 (as an example) next is reached. This alternative may be carried out by providing a switch between adding circuit ADD and dividing circuit DIV, this switch being closed once during every four track scans, such as when sampling switch SWB2 is closed. Such additional switch then may be opened before sampling switch SWA1 next is operated; and the resultant averaged tracking control signal S5 may be stored in a conventional storage device, such as a capacitor (not shown). Alternatively, adding circuit ADD may be controlled such that it sums sampled error detection signals S3A1, S3B1, S3A2 and S3B2 only once during every four track scans. Hence, even though the individual sampled error detection signals are updated during each track scan, the averaged tracking control signal S5 is updated only once after every four track scans. As yet a further alternative, tracking control S5 may be updated after any desired number of track scans, such as x scans (x>1).

If, as mentioned previously, sampling switches SWA1-SWB2 are closed when the transducer reaches different discrete portions in tracks TA1-TB2, respectively, each sampled error detection signal produced by a sampling switch may be accumulated (or summed) in the sample-and-hold circuit coupled thereto. In this alternative, each sampled error detection signal S3A1-S3B2 supplied to adding circuit ADD is comprised of a plurality of error detection samples which are produced during a track scan.

Tracking error signal averaging circuit 31 has been shown and described as being formed of discrete electronic circuits. This circuitry may be manufactured as an integrated circuit. As a further alternative, a suitably programmed microprocessor, such as an Intel Model 8086, or the like, may be employed to carry out the aforedescribed sampling and averaging operations.

Although not discussed herein, it will be recognized that, if desired, tracking control signal S5 may be further modified, as by multiplying same with a predetermined coefficient, before being supplied to suitable servo mechanisms by which the transducer tracking error is corrected.

While the present invention has been particularly shown and described with reference to a preferred embodiment, it will be readily apparent to those of ordinary skill in the art that various changes and modifications may be made without departing from the spirit and scope of the invention. Some of these changes and modifications have been discussed above and others will be apparent to those of ordinary skill. It is, therefore, intended that the appended claims be interpreted as including the embodiment described herein, the aforementioned changes, modifications and alternatives, and all other equivalents thereto.

What is claimed is:

1. Apparatus for producing tracking control signals from an information signal comprised of a video component and a tracking information component, said information signal being recorded in parallel oblique tracks on a record medium, said apparatus comprising:
    transducer means for scanning successive tracks to reproduce said information signal;
    means for separating said tracking information component from the reproduced information signal and producing in response thereto error detection signals representing scanning errors of said transducer means;
    means for sampling a respective one of said error detection signals produced in response to each scan of said tracks such that a plurality of sampled error detection signals are thereby supplied;
    storage means for storing a predetermined number of said sampled error detection signals and for updating one of the stored, sampled error detection signals with a fresh sampled error detection signal in response to each scan of said tracks;
    adder means for adding plural ones of the stored and updated sampled error detection signals to produce an added signal;
    means for supplying the stored and updated sampled error detection signals to said adder means for each scan of said tracks; and
    divider means for dividing the added signal by a predetermined factor to produce said tracking control signals.

2. Apparatus for producing tracking control signals from an information signal comprised of a video component and a tracking information component, said information signal being recorded in parallel oblique tracks on a record medium, said apparatus comprising:
    transducer means for scanning successive tracks to reproduce said information signal;

means for separating said tracking information component from the reproduced information signal and producing in response thereto error detection signals representing scanning errors of said transducer means;

means for sampling a respective one of said error detection signals produced in response to each scan of said tracks such that a plurality of sampled error detection signals are thereby supplied;

storage means for storing a predetermined number of said sampled error detection signals and for updating one of the stored sampled error detection signals with a fresh sampled error detection signal in response to each scan of said tracks;

adder means for adding the stored and updated sampled error detection signals after the scanning of a predetermined number of tracks to produce an added signal; and divider means for dividing the added signal by a predetermined factor to produce said tracking control signals.

3. Apparatus for producing tracking control signals from an information signal comprised of a video component and a tracking information component, said information signal being recorded in parallel oblique tracks on a record medium, said apparatus comprising:

transducer means for scanning successive tracks to reproduce said information signal;

means for separating said tracking information component from the reproduced information signal and producing in response thereto error detection signals representing scanning errors of said transducer means;

sampling switch means for receiving said error detection signals;

sampling pulse generating means for supplying to said sampling switch means sampling pulses timed to occur when said transducer means scans a portion of a track substantially centrally located along a scanning direction thereof;

said sampling switch means being responsive to said sampling pulses to produce sampled error detection signals;

adder means for adding plural ones of said sampled error detection signals to produce an added signal; and divider means for dividing said added signal by a predetermined factor to produce said tracking control signals.

4. Apparatus for producing tracking control signals from an information signal comprised of a video component and a tracking information component, said information signal being recorded in parallel oblique tracks on a record medium, said apparatus comprising:

transducer means for scanning successive tracks to reproduce said information signal;

means for separating said tracking information component from the reproduced information signal and producing in response thereto error detection signals representing scanning errors of said transducer means;

sampling switch means for receiving said error detection signals;

sampling pulse generating means for supplying to said sampling switch means sampling pulses timed to occur when said transducer means reaches plural discrete locations along a track;

said sampling switch means being responsive to said sampling pulses to produce sampled error detection signals;

adder means for adding plural ones of said sampled error detection signals to produce an added signal; and divider means for dividing said added signal by a predetermined factor to produce said tracking control signals.

5. A method of producing a tracking control signal for controlling the scanning by transducer means of successive tracks recorded on a record medium in which information and control signals are recorded, said method comprising the steps of recovering the control signals from the tracks scanned by said transducer means; deriving error indicating signals from the recovered control signals indicative of tracking errors of respective scans of said transducer means; sampling the error indicating signals once during each scan of a track when said transducer means scan a portion of said track approximately centrally located along a scanning direction thereof to produce one scanning error sample for each track; and averaging plural scanning error samples produced for plural scans to produce said tracking control signal.

6. A method of producing a tracking control signal for controlling the scanning by transducer means of successive tracks recorded on a record medium in which information and control signals are recorded, said method comprising the steps of recovering the control signals from the tracks scanned by said transducer means; deriving error indicating signals from the recovered control signals indicative of tracking errors of respective scans of said transducer means; sampling the error indicating signals plural times during each scan of a track to produce plural samples; combining said plural samples to produce a scanning error sample for each scanned track; and averaging plural scanning error samples produced for plural scans to produce said tracking control signal.

7. A method of producing a tracking control signal for controlling the scanning by transducer means of successive tracks recorded on a record medium in which information and control signals are recorded, said method comprising the steps of recovering the control signals from the tracks scanned by said transducer means; deriving error indicating signals from the recovered control signals indicative of tracking errors of respective scans of said transducer means; sampling the error indicating signals derived during each scan of a track to produce scanning error samples; averaging plural scanning error samples produced for a predetermined number of scans to produce said tracking control signal; and updating said tracking control signal once in response to the scanning of a number of tracks equal to said predetermined number.

* * * * *